Figure 1:
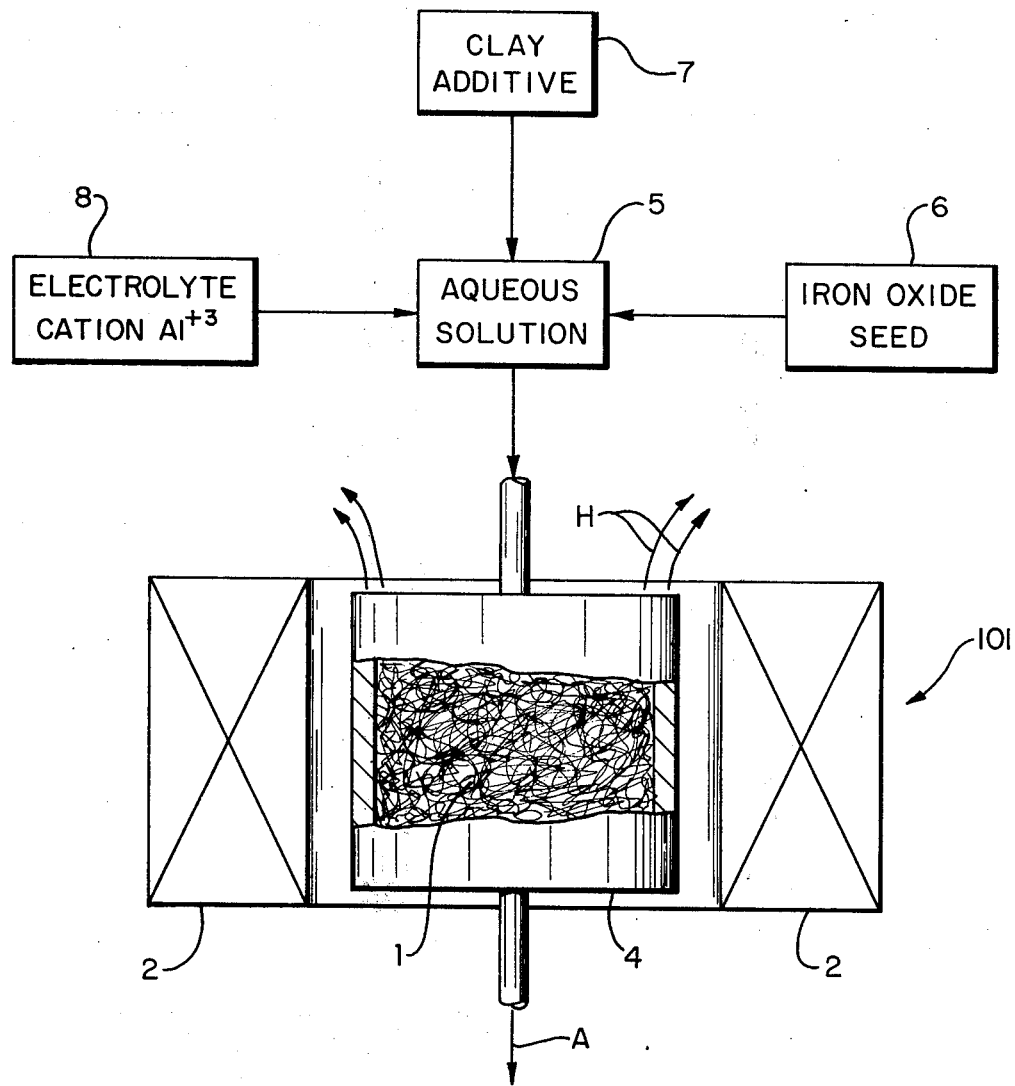

United States Patent [19]

de Latour

[11] 3,983,033
[45] Sept. 28, 1976

[54] PROCESS FOR REMOVING DISSOLVED PHOSPHORUS FROM WATER MAGNETICALLY

[75] Inventor: Christopher de Latour, Arlington, Va.

[73] Assignee: Massachusetts Institute of Technology, Cambridge, Mass.

[22] Filed: Mar. 12, 1975

[21] Appl. No.: 557,841

Related U.S. Application Data

[63] Continuation-in-part of Ser. No. 344,808, March 26, 1973, abandoned.

[52] U.S. Cl. .............................. 210/49; 210/42 S; 210/53; 210/DIG. 29
[51] Int. Cl.² ........................................ C02B 1/20
[58] Field of Search ................. 210/18, 42, 46, 49, 210/51–53, 65, 222, 223, DIG. 29

[56] References Cited
UNITED STATES PATENTS

| 2,232,294 | 2/1941 | Urbain et al. ......................... 210/42 |
| 2,281,759 | 5/1942 | Gelder .................................... 210/49 |
| 3,142,638 | 7/1964 | Blaisdell et al. ...................... 210/51 |
| 3,488,717 | 1/1970 | Wukasch et al. ..................... 210/53 |
| 3,506,570 | 4/1970 | Wukasch ............................... 210/49 |
| 3,676,377 | 7/1972 | Kolm ..................................... 210/42 |
| 3,697,420 | 10/1972 | Blaisdell et al. ...................... 210/42 |

FOREIGN PATENTS OR APPLICATIONS

| 232,163 | 5/1959 | Australia ............................... 210/51 |

Primary Examiner—Charles N. Hart
Assistant Examiner—Peter A. Hruskoci
Attorney, Agent, or Firm—Arthur A. Smith, Jr.; Robert Shaw; Martin M. Santa

[57] ABSTRACT

A process wherein an aqueous solution containing dissolved phosphorus is seeded with iron oxide and a clay additive, if necessary, and with the electrolyte cation $Al^{+3}$, the latter acting to associate the dissolved phosphate with the iron oxide and clay to form a coagulum. The coagulum is then removed from the solution magnetically.

10 Claims, 3 Drawing Figures

|  | ORTHOPHOSPHATE | |
|---|---|---|
|  | control | treated |
| CHARLES RIVER SAMPLE |  |  |
| no clay added | 330 ppb | 180 ppb |
| bentonite used | 330 ppb | 60 ppb |
| DEER ISLAND SEWAGE |  |  |
| no clay added | 3.0 ppm | 0.3 ppm |
| bentonite used | 3.0 ppm | <0.1 ppm |

FIG. 2

PROCESS FOR REMOVING DISSOLVED PHOSPHORUS FROM WATER MAGNETICALLY

The invention herein described was developed, in part, in the course of or under a contract from the National Science Foundation, an agency of the United States Government.

This application is a continuation-in-part of application Ser. No. 344,808, filed Mar. 26, 1973 now abandoned.

The present invention relates to processes for removing phosphorus from aqueous solutions and, in particular, to processes wherein a magnetic seed material, a montmorillinite or some similar clay material, if necessary, and an electrolyte are added to the solution to form a coagulum that is separated magnetically from the solution.

There accompanies herewith a copy of the doctoral thesis of the present inventor which was deposited in the library system of the Massachusetts Institute of Technology on or about Nov. 11, 1974, said thesis is hereby incorporated herein by reference.

In the discussion that follows, the type of magnetic separator employed in connection with the work described is that explained in great detail in U.S. Letters Pat. Nos. 3,567,026 and 3,676,337 (Kolm). The present inventor acknowledges prior work of Peter Grant Marston of Magnetic Engineering Associates, Inc., Cambridge, Mass., who proposed the following to remove bacteria cells and suspended solids from an aqueous solution (the work done was in connection with water from the Charles River): add approximately 4 grams per gallon iron seeding material to the solution, stir in ferric or ferrous chloride ions as a simple electrolyte, after allowing some retention time, add a polyelectrolyte material like Calgon, and remove the resulting coagulum magnetically. The Marston work was not directed to the removal of phosphorus from an aqueous solution.

An object of the invention is to provide a way of removing phosphorus from an aqueous solution magnetically.

Another object is to provide a process which permits huge quantities of the solution of the order of thousands of gallons per hour to be cleansed of dissolved phosphate ions.

Still another object is to provide a process which employs seed materials that are available in sufficient quantities and at a sufficiently low cost to permit their use in the necessary volume to make the process useful.

These and still further objects are evident in the description that follows and are particularly delineated in the appended claims.

The objects of the invention are attained by a process for removing dissolved phosphorous from an aqueous solution, that includes, introducing iron oxide seed material to the solution, introducing to the solution the electrolyte cation species $Al^{+3}$, said electrolyte cation acting to associate the dissolved phosphorus with the iron oxide seed material to form a coagulum and magnetically separating the coagulum from the aqueous solution. Under conditions wherein little or no solid materials are naturally present in the solution, there is added a clay material to provide more surface for phosphate adsorption and to enhance formation of the coagulum. The serial or concurrent steps of adding iron oxide and clay, and then the electrolyte cation, the agitation of the solution after each addition, and allowing suitable retention times, before magnetic removal, result in most effective phosphate removal. Separation of the coagulum from the aqueous solution is effected by passing the aqueous solution through a magnetic filter and allowing filter contact time for coagulum removal substantially less than the retention time necessary for coagulum formation. Other aqueous metal ions such as $Fe^{+3}$, $Ca^{+2}$ and $Fe^{+2}$ may be used, but $Al^{+3}$ is by far best for present purposes.

Figure 3:
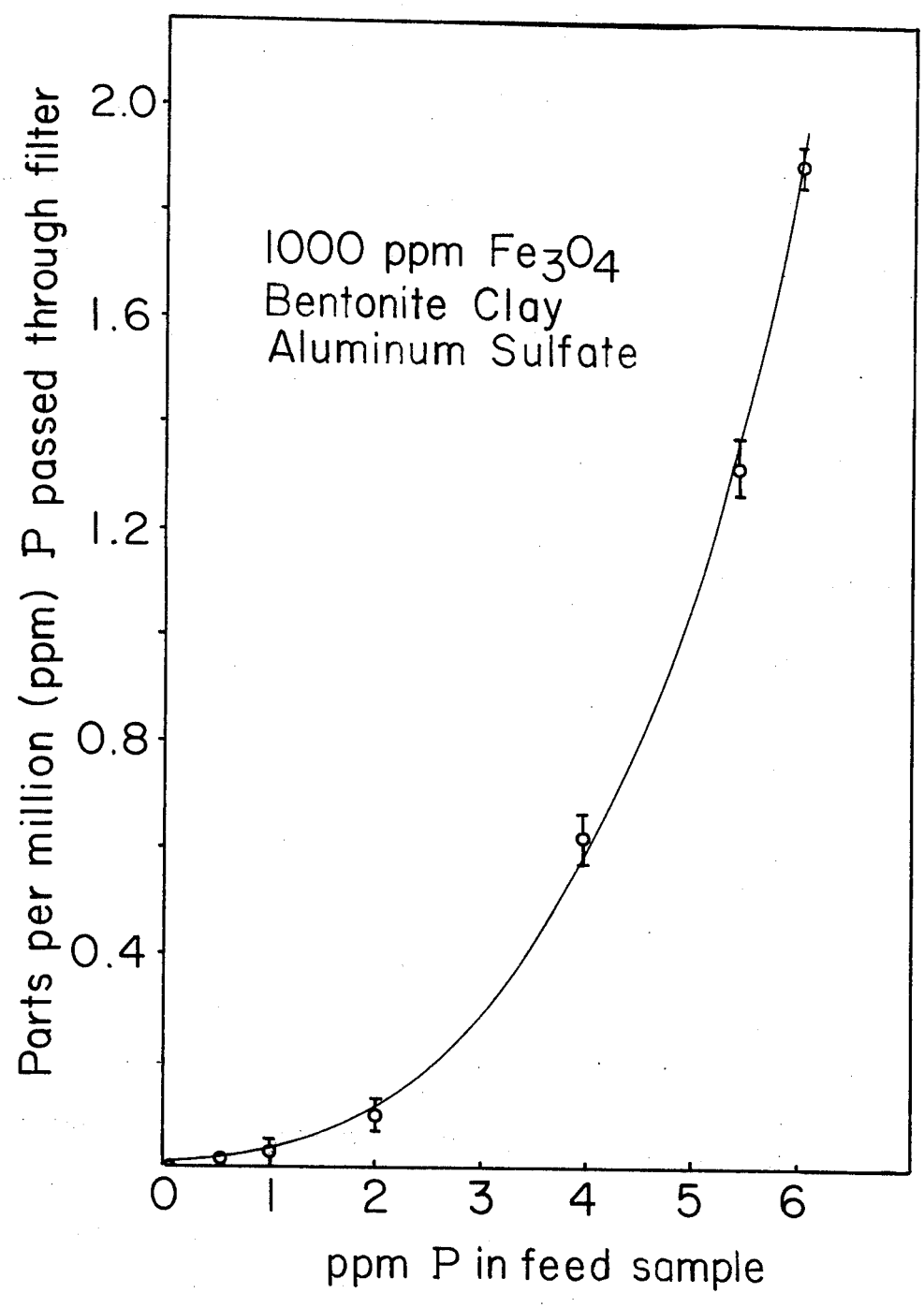

The invention is hereinafter described with reference to the accompanying drawing in which, FIG. 1 is a diagrammatic figure, partially cutaway and partly in block-diagram form, of a system adapted to practice the inventive concepts herein disclosed;

FIG. 2 is a table showing phosphate removal for samples of water taken from the Charles River in Cambridge, Mass. and for samples taken from the Deer Island sewage plant of the Commonwealth of Massachusetts; and FIG. 3 shows graphically the amount of phosphate ions that are passed through the system of FIG. 1 as a function of initial concentration.

The separator shown at 101 in FIG. 1 is of the Kolm-type described in said patents. In the separator, a filamentary matrix 1 (e.g., stainless steel wool) is disposed within a non-magnetic housing 4, the housing being located within the center of a solenoidal coil represented diagrammatically by the element labeled 2 in the figure. The coil 2, when energized by a source of d-c current (not shown), provides a magnetic background field H within the volume occupied by the matrix 1; the field H acts to magnetize the filaments of the matrix as well as any particles passing through the matrix. The Kolm-type separator permits separation of magnetic and paramagnetic materials even in colloidal size and even when the water or other fluid carrier is passed through the separator at the rate of thousands of gallons per hour. The present process finds greatest interest in processes for removing phosphorus from sewage. It therefore is concerned with acting upon thousands of gallons per hour of water and is adapted to remove phosphorus therefrom.

In the system of FIG. 1, an aqueous solution containing dissolved phosphorus is represented by the block labeled 5. An iron oxide seed material is introduced to the solution from the block labeled 6, a clay material, if necessary, from block 7, and the electrolyte cation species $Al^{+3}$, is introduced to the solution from the block labeled 8. The aqueous solution is passed through the corrosion resistant, filamentary matrix 1 to separate the coagulum formed, as later discussed, from the solution. The solution leaves the separator 101 as indicated by the arrow shown at A. Periodically, the magnetic background field H is reduced to zero and the matrix 1 is purged of the coagulum by flushing with water or by an air stream. Most favorable results are obtained by introducing the iron oxide first, and (when needed) clay second, and then the electrolyte cation, in that order and as serial steps. A retention time is provided after the addition of the iron oxide of the order of 30 seconds, a retention time after the addition of the clay of the order of 30 seconds (the iron oxide and clay can be simultaneous additions), and a retention time after the addition of the electrolyte cation of the order of 1–3 minutes. After each seed material is added, agitation is employed to assure uniform dispersion throughout the solution. Ideally, the process employs a serial system wherein there is a continuous flow of solution between input and output, wherein agitation is effected after each seed material is added, and wherein the piping lengths and flow rates are controlled to provide the required retention time.

As is above noted, a process of the type herein disclosed is useful only if it permits the cleansing of thousands of gallons per hour of sewage or other effluent. The flow rate necessary to effect such results places a heavy burden upon the capability of the magnetic separator, but it also dictates use of seed materials that are available at low cost, near the place of usage and in large quantities. For present purposes, the proposed iron oxide is $Fe_3O_4$, the clay used, if necessary, is montmorillinite clay, and the electrolyte cation is $Al_2(SO_4)_3 \cdot 18H_2O$. It should be noted, however, that any salt containing the $Al^{+3}$ or $Fe^{+3}$ or $Ca^{+2}$ or $Fe^{+2}$ ion can also be used (such as ferric chloride, aluminum nitrate, etc.), but that $Al^{+3}$ is the most effective of the ions named and is the one discussed in greatest detail herein.

Most water sources that would be used in a process of the type herein discussed contain suspended solids which include clay particles that are colloidal in dimensions. The presence of the clay particles serves two purposes. First, these particles act as a surface onto which dissolved orthophosphate ions can adsorb and, second, they aid in coagulation. When such clay particles are present, the addition of the magnetic seeding material $Fe_3O_4$ followed by the addition of the electrolyte ion $Al^{+3}$ is sufficient to bind the dissolved phosphate ions into a tight coagulum that is removed magnetically. For this reason, the addition of a montmorillinite clay is not always necessary for good removal of the phosphate content.

In some circumstances, however, the suspended solids content is very low, as for example in raw drinking water samples. In this case, the use of the iron oxide seeding material followed by the electrolyte ion $Al^{+3}$ does not remove the phosphorus content satisfactorily. There must be an addition of between 10 to 100 ppm of a montmorillinite clay with or after the magnetic seed and before the addition of the electrolyte ion $Al^{+3}$.

In either case, however, the addition of the montmorillinite or some similar clay will always enhance phosphate removal, and the work done by the present inventor indicates that its presence is necessary for complete removal. That is not to say, however, that the addition of $Fe_3O_4$ and the electrolyte ion $Al^{+3}$ alone does not remove some of the dissolved phosphate. These two additives without the clay do remove phosphate, but not as efficiently as if some clay is in the system.

In the present process, co-precipitation occurs wherein the $Al^{+3}$ hydrolyzes in an aqueous solution and forms what can be termed hydroxo polymers which have the ability to bridge between the suspended particles of the system which include the magnetic seed $Fe_3O_4$, clay particles and other miscellaneous suspended matter. It is clear from the present work that although $Al^{+3}$ and the other named metal ions all undergo olation reactions in the formation of polynuclear bridges that aluminum does so more effectively.

The chemistry of the process is now explained. The aluminum ion in water is coordinated to six ligand ions. The nature of the ligand ion, and the valency of the entire complex, depends on the concentration of various ionic species in the system, especially the pH. These metal ion hydrolysis species undergo a series of olation reactions in which they polymerize into a group of aluminum ions joined by hydroxyl groups.

Metal ion hydrolysis products are strongly adsorbed at solid interfaces. Adsorption is especially strong for the polynuclear hydroxo complexes that are the end result of the olation reactions mentioned above. The strong surface adsorption is apparently due in part to the presence of of the $OH^-$ groups as ligand ions in the coordination sheath of the $Al^{+3}$. Simple $OH^-$ ions are quite ubiquitous on solid surfaces, and often they are potential determining ions. The hydroxyl groups of the aluminum complex are therefore compatible with a solid surface that would normally like to adsorb $OH^-$ groups, and in fact a very strong adsorption of the aluminum complex occurs.

Therefore, when aluminum ions are added to the solution, most solid surfaces become coated with aluminum hydroxo complexes, whether monomeric or polynuclear. A "fluff" of precipitated coagulant surrounds each particle. This action of the aluminum hydroxo complex aids coagulation in two possible ways. First, adsorption of the complex onto a contaminant alters that particle's surface charge. Near pH7, most waterborne contaminants are negatively charged, and for all but very alkaline solutions, the adsorbed hydroxo species will be positive. This reduction of the contaminant surface charge makes coagulation possible. Second, through the abovementioned olation reactions and especially because of the presence of the insoluble aluminum hydroxide form $Al(OH)_3(H_2O)_3$, the coagulant "fluff" about each particle can grow, such that a great number of contaminant particles become associated through aluminum (or other metal ion) "bridges."

In this procedure, magnetite is the iron oxide seed that is found most useful. If the solution has a high content of suspended solids before treatment, no further additives are necessary and the addition of the aluminum ions to the solution causes the phosphate ions to be bound into the coagulum. If, however, the system contains very little other suspended solid matter, a near colloidal montmorillonite clay can be added, as above noted, to aid both in phosphate removal and the coagulation of the system. The table of FIG. 2 shows orthophosphate-p removal for Deer Island samples, both with and without clay additives, and removal for Charles River samples with and without clay additive.

Phosphate ions in solution react chemically with aqueous metal ions of $Ca^{+2}$, $Fe^{+3}$, $Al^{+3}$ and $Fe^{+2}$. In the case of the free $Al^{+3}$ ions in solution, orthophosphate ions complex into the coordination sheath of the metal ion and become one of the six ligand ions surrounding the $Al^{+3}$. Free $Fe^{+3}$ on the surface of the iron oxide particles can also react with ions in solution; so some of the dissolved phosphate will be associated with the magnetite seeding material. When montmorillinite clay is used, even more phosphate is removed from the solution, as previously noted herein, due to the well known adsorption of orthophosphate to the positively charged edge of the clay plates. These three possible mechanisms compete, making the magnetic filtration technique quite effective in removing dissolved phosphate ions rapidly.

FIG. 3 shows the amount of phosphate ions passed through apparatus like that of FIG. 1 as a function of the initial concentration, for artificial samples of dissolved phosphorus in distilled water. Colloidal clay particles were necessarily added to the samples in this laboratory work both to provide more surface for phosphate adsorption and to aid in coagulation. If coagulation is incomplete, aluminum hydroxo complexes that contain phosphate ions will not become associated with the magnetic seed and will not be removed during treatment. The specific parameters chosen for the examination of FIG. 3 are not optimum. However, this figure does demonstrate the nature of the removal.

The data of FIG. 3 is also applicable to multiple passes. For example, it was found in tests run that an initial feed sample containing 5.2 parts per million orthophosphate when treated a single time and passed through the filter 101 resulted in a solution having 1.27 ± 50 ppm. The sample was then treated in the exact manner as before and again passed through the magnetic filter; the orthophosphate content for this second pass was found to be 80 ± 20 parts per billion, in good agreement with the data of FIG. 3. Therefore, if a water source contains a high concentration of orthophosphate, multiple passes may be required, but the phosphorus content can be removed to a low level.

Typically, the $Fe_3O_4$ used in the process above described was in the size range of 0.1 to 0.5 microns when dry and greater than 0.5 microns when in a slurry, due to clumping. Some work was also done using colloidal size $Fe_3O_4$ with good results. Further, it was found that colloidal (<0.1 micron particles) $Fe_3O_4$ acts itself to form a coagulum with the phosphorous, in a useful way, even in the absence of the electrolyte. The usefulness of this latter process depends on the availability of large quantities of colloidal $Fe_3O_4$ at allowable costs.

Typically, the aqueous solution can be passed through a Kolm-type magnetic filter at the rate of two hundred fifty gallons per minute per square foot of filter surface area; said another way, the contact time between the filter and the aqueous solution for coagulum removal is the order of one two hundred and fiftieth of a minute or less, per square foot of filter surface area. The velocity of the aqueous solution through the filter is typically 15 to 25 centimeters per second which is about the free fall rate of the solution. It should be appreciated that the flocs forming the coagulum must withstand the large forces present due to the liquid flow past the filter and turbulence therein and retain the floc integrity if separation of the coagulum from the solution is to be effected. Also, the system operation is such that magnetic filtering is continuous and concurrent with floc formation, that is, floc formation in one part of the system occurs at the same time as other flocs are being removed at another part of the system. Furthermore, since the magnetic filter herein discussed is so effective, the floc size and, hence, retention times can be greatly reduced over such times needed for sedimentation.

Further modifications of the invention here disclosed will occur to persons skilled in the art, and all such modifications are deemed to be within the spirit and scope of the invention as defined by the appended claims.

What is claimed is:

1. A process for removing orthophosphate ions from an aqueous solution containing suspended solids, comprising, introducing iron oxide seed material particles at about 100–1000 parts per million in the size range >0.1 microns into said aqueous solution, introducing an electrolyte cation selected from the group consisting essentially of the metal ions $Al^{+3}$, $Fe^{+3}$, $Ca^{+2}$ and $Fe^{+2}$ at about 3–10 parts per million into said aqueous solution, said electrolyte cation acting first to associate with itself said orthophosphate ions and, second, to associate through metal ion hydroxo bridges said iron oxide, said bridges having also complexed some of said orthophosphate ions, agitating the solution, allowing a retention time of the order of one to three minutes for a coagulum containing said orthophosphate ions to form, said solution containing sufficient suspended solids to permit said coagulum to form, and then magnetically filtering said aqueous solution to separate the coagulum from the liquid portion of the aqueous solution by passing said aqueous solution at a high flow rate through magnetic filtering means comprising a magnetized filamentary matrix, said high flow rate allowing filter contact time for coagulum removal substantially less than said retention time.

2. A process as claimed in claim 1 that further includes adding colloidal or near colloidal clay particles at of the order of 10–100 parts per million, the process comprising the steps of adding the iron oxide, the clay particles, and the electrolyte cation.

3. A process as claimed in claim 2 that further includes agitating the solution after each addition and allowing suitable retention time between each addition.

4. A process as claimed in claim 2 in which the clay material is a montmorillinite clay.

5. A process as claimed in claim 1 in which the oxide seed material is $Fe_3O_4$.

6. A process as claimed in claim 1 in which the electrolyte cation is introduced in the form $Al_2(SO_4)_3$. 18 $H_2O$.

7. A process as claimed in claim 1 that includes agitating the solution after introduction of both the iron oxide seed material and the electrolyte cation.

8. The process of claim 1 wherein said iron oxide seed material has a particle size of about 0.1 to 0.5 microns.

9. The process of claim 1 wherein said step of magnetically filtering is carried out continuously.

10. A process for removing orthophosphate ions from an aqueous solution containing suspended solids, comprising, introducing an effective amount of colloidal iron oxide seed material particles into said solution, said iron oxide seed material particles having a colloidal particle size less than 0.1 micron, agitating the solution, allowing a retention time sufficient for a coagulum containing the orthophosphate ions and iron oxide particles to form, said solution containing sufficient suspended solids to permit said coagulum to form, and then magnetically filtering said solution to separate the coagulum from the aqueous portion thereof by passing said aqueous solution at a high flow rate through a magnetic filter comprising a magnetized filamentary matrix, said high flow rate allowing filter contact time for coagulum removal substantially less than said retention time.

* * * * *